United States Patent
Epstein et al.

(10) Patent No.: US 7,191,119 B2
(45) Date of Patent: Mar. 13, 2007

(54) INTEGRATED DEVELOPMENT TOOL FOR BUILDING A NATURAL LANGUAGE UNDERSTANDING APPLICATION

(75) Inventors: Mark E. Epstein, Katonah, NY (US); Sharon B. Jones, White Plains, NY (US); Robert T. Ward, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 10/140,522

(22) Filed: May 7, 2002

(65) Prior Publication Data

US 2003/0212543 A1 Nov. 13, 2003

(51) Int. Cl.
*G06F 17/21* (2006.01)
(52) U.S. Cl. .................. 704/10; 704/1; 704/9
(58) Field of Classification Search .............. 704/1, 704/9, 10
See application file for complete search history.

(56) References Cited

U.S. PATENT DOCUMENTS

| | | | | |
|---|---|---|---|---|
| 4,914,590 A | * | 4/1990 | Loatman et al. | 704/8 |
| 5,068,789 A | * | 11/1991 | van Vliembergen | 704/9 |
| 5,794,050 A | * | 8/1998 | Dahlgren et al. | 717/144 |
| 5,963,940 A | * | 10/1999 | Liddy et al. | 707/5 |
| 6,496,208 B1 | * | 12/2002 | Bernhardt et al. | 715/853 |
| 2002/0103837 A1 | | 8/2002 | Balchandran et al. | |

FOREIGN PATENT DOCUMENTS

WO   WO 99/17223   4/1999

OTHER PUBLICATIONS

Meng, et al., "Semiautomatic Acquistion of Semanatic Structures for Understanding Domain-Specific Natural Language Queries", IEEE Trans. on Know. & Data, V. 14, #1, J.2002.
"Method of Displaying & Using Single & Multiple Statuses in a Statistical NLU Development Environment", IBM Research Disclosure, No. 450, Art. 114, (Oct. 2001).

* cited by examiner

*Primary Examiner*—Richemond Dorvil
*Assistant Examiner*—Leonard Saint-Cyr
(74) *Attorney, Agent, or Firm*—Akerman Senterfitt

(57) ABSTRACT

A method of developing natural language understanding (NLU) applications can include determining NLU interpretation information from an NLU training corpus of text using a multi-pass processing technique. The alteration of one pass automatically can alter an input for a subsequent pass. The NLU interpretation information can specify an interpretation of at least part of the NLU training corpus of text. The NLU interpretation information can be stored in a database, and selected items of the NLU interpretation information can be presented in a graphical editor. User specified edits also can be received in the graphical editor.

73 Claims, 15 Drawing Sheets

| NLU IDE | | |
|---|---|---|
| # | Count | Text |
| 1 | 1 | MAINMENU :MAYIHELPYOU i'd like more information on the fundX |
| 2 | 1 | MAINMENU :MAYIHELPYOU can you describe the risk of fundX in further detail |
| 3 | 1 | MAINMENU :MAYIHELPYOU fund objectives and descriptions please |
| 4 | 1 | MAINMENU :MAYIHELPYOU the fundX i'd like further clarification on what type of investment it is |
| 5 | 1 | MAINMENU :MAYIHELPYOU the fidelity fund option i need a description of this |
| 6 | 3 | APPROACH :FUND the first one |
| 7 | 1 | APPROACH :FUND the second fund you listed |
| 8 | 1 | APPROACH :FUND the fundX |
| 9 | 3 | APPROACH :CATEGORY fundX |

Classer    4 of 36461

Figure 9

| IDE | | |
|---|---|---|
| Tag / Label | Spelling | Description |
| Label | FUN | |
| Label | OR | |
| Label | IS | |
| Tag | fund- | |
| Tag | or | |
| Tag | fun | |

Add Tag / Labels    Cancel

Figure 14

INTEGRATED DEVELOPMENT TOOL FOR BUILDING A NATURAL LANGUAGE UNDERSTANDING APPLICATION

BACKGROUND OF THE INVENTION

1. Technical Field

This invention relates to the field of natural language understanding, and more particularly, to an integrated development tool for building a natural language understanding application.

2. Description of the Related Art

Natural language understanding (NLU) systems enable computers to understand and extract information from human speech. Such systems can function in a complimentary manner with a variety of other computer applications, such as a speech recognition system, where there exists a need to understand human speech. NLU systems can extract relevant information contained within text and then supply this information to another application program or system for purposes such as booking flight reservations, finding documents, or summarizing text.

Currently within the art, NLU systems employ several different techniques for extracting information from text strings, where a text string can refer to a group of characters, words, or a sentence. The most common technique is a linguistic approach to parsing text strings using a context free grammar, commonly represented within the art using Backus-Naur Form (BNF) comprising terminals and non-terminals. Terminals refer to words or other symbols which cannot be broken down any further, whereas typically, non-terminals refer to parts of speech or phrases such as a verb phrase or a noun phrase. Thus, the grammatical approach to NLU seeks to parse each text string based on BNF grammars without the use of statistical processing.

To build such a grammar based NLU system, a linguist is typically required, which can add significant time and expense to application development. The quality of an NLU application, however, can be unsatisfactory due to the difficulty of predicting each potential user request or response to a prompt, especially in relation to a telephonic conversational style. Notably, such unsatisfactory results can occur despite the use of a linguist.

Another technique used by NLU systems to extract information from text strings is a statistical approach where no grammar is used in analyzing the text string. Presently such systems learn meaning from a large corpus of annotated sentences. The annotated sentences are collected into a corpus of text which can be referred to as a training corpus. The tools used to develop statistical NLU systems and annotate text have included such disparate elements as ASCII files, conventional text editors, and keyboard macros. Using these inefficient tools, word relationships can be specified and a statistical model can be built. Thus far, however, an efficient and accurate graphical visual editing tool has yet to be developed. In consequence, the development of statistical NLU applications typically has been reserved for trained experts.

Another disadvantage of using conventional NLU application development tools is that development in a team environment can be difficult. Notably, because existing tools make use of disparate components, such development tools are unable to track or flag changes made by one team member to prevent another team member from overwriting or re-annotating the same portion of text. Moreover, conventional development tools cannot identify the situation wherein multiple instances of a particular sentence within the training corpus have been annotated in a manner that is inconsistent with one another.

SUMMARY OF THE INVENTION

The invention disclosed herein concerns a method and a system for building a natural language understanding (NLU) application. In particular, the invention disclosed herein can provide users with an integrated development tool in which to build statistical models. Rather than using a series of text files, text editors, and keyboard macros to specify interpretation information specifying an interpretation, meaning, or structure of a corpus of text, the invention can utilize a database, as well as an assortment of graphical editing and audible tools to specify interpretation information. The database functionality of the invention, including the invention's ability to synchronize and label user edits, makes the invention particularly suited for use in a networked or workgroup environment. The invention can offer increased functionality as a result.

One aspect of the present invention can include a method of developing NLU applications. The method can include determining NLU interpretation information from an NLU training corpus of text using a multi-pass processing technique. Notably, an alteration of one pass can automatically alter an input for a subsequent pass. The NLU interpretation information specifies an interpretation of at least part of the NLU training corpus of text. The NLU interpretation information can be stored in a database. Within a graphical editor, selected items of NLU interpretation information can be presented; and user specified edits to the NLU interpretation information can be received.

The presenting step can include presenting the NLU interpretation information as a meaning tree including terminal and non-terminal nodes representing data items. According to one embodiment of the invention, a probability indicating whether a portion of the meaning tree is correct can be determined. That portion of the meaning tree can be visually identified if the probability does not exceed a predetermined threshold probability. Alternatively, a number of occurrences of a substructure of the meaning tree within the NLU interpretation information can be determined. The substructure of the meaning tree can be visually identified if the number of occurrences does not exceed a predetermined threshold.

The method also can include determining an intersection of selected nodes of the meaning tree from the NLU interpretation information, presenting the intersection of the selected nodes as choices for adding an additional node to the meaning tree, and then adding a node above the selected nodes of the meaning tree. Notably, the added node can be selected from the presented choices. Additional nodes of the meaning tree can be created responsive to user commands. The additional nodes can represent an additional data item. Users further can input descriptions for the added nodes, which can be spell checked as the description is entered. In the case where a node of the meaning tree is selected, responsive to a user request, a dictionary view having one or more columns for displaying the nodes and parameters of the nodes can be displayed. Notably, the dictionary view can include or be focused on the area of the dictionary having the data item represented by the highlighted node of the meaning tree.

The meaning tree can be automatically completed according to predetermined annotation data such as a dictionary of data items, or a model specifying text interpretations. In one embodiment, a determination can be made as to whether a single data item of the dictionary of data items is associated with a word of the NLU training corpus of text. If so, the single data item can be assigned to the word. Selected items of the NLU interpretation information can be displayed in tool tip fashion and a probability indicating whether the presented meaning tree is a correct interpretation. The method also can include searching the NLU interpretation information for a specified meaning tree structure. An intersection of data items can be identified and presented as selections for annotating a user specified word of the NLU training corpus of text.

Another aspect of the present invention can include presenting the NLU interpretation information in a dictionary view. In that case, NLU interpretation information can be presented using one or more columns for displaying parent and child data items, and parameters of the data items. The dictionary view can include a column for indicating children of the data items and a column indicating parents of the data items. The data items can be sorted according to any of the columns including the parent and child columns. Data items displayed in the dictionary view can be visually distinguished if the data items have a probability or count exceeding a predetermined threshold. Data items displayed in the dictionary view having a probability or count not exceeding a predetermined threshold can be hidden from view. Responsive to a user selection of particular data items having an association, the NLU interpretation information can be searched for a meaning tree including terminal and non-terminal nodes representing the association. The method further can include filtering the NLU interpretation information according to a parameter such as a data item source, a data item target, a direction associated with a data item, an annotator associated with a data item, annotation status, a node count, a data file, a sentence range, and/or a usage status. Histogram information derived from the NLU interpretation information also can be displayed.

Another aspect of the present invention can include presenting the NLU interpretation information in a sentence view. NLU interpretation information associated with individual text phrases can be displayed. For example, information such as the annotation status, count, designated use, collection information, a correctness probability, and a correctness rank can be displayed on a per sentence and/or phrase basis.

Yet another aspect of the present invention can include presenting the NLU interpretation information as one or more meaning trees in a split screen view. The split screen view can include at least a first window for displaying a first meaning tree and a second window for displaying a second meaning tree. The method can include presenting different ones of the meaning trees in the second window responsive to a user request, while displaying the first meaning tree in the first window. The meaning trees can be different interpretations of the same text phrase in a same context, different interpretations of a same text phrase in two different contexts, or can be the results of different processing passes. For example, the first window can present the meaning tree as determined after a first processing pass and the second window can present the resulting meaning tree as determined after a subsequent processing pass. Alternatively, the first meaning tree can represent a correct interpretation of a text phrase; and, the second meaning tree can represent a predicted interpretation of a text phrase according to a statistical model. If a score of the correct interpretation is greater than a score of the predicted interpretation, then an indication can be provided that the statistical model is incorrect. Where the first meaning tree represents a first text phrase, the method can include receiving an edit to the first meaning tree in the first window, and responsive to a user edit, searching for a meaning tree of a different text phrase which corresponds to the edited first meaning tree, and displaying the meaning tree for the different text phrase in the second window. The method can include visually indicating differences between the first meaning tree and the second meaning tree, and conforming the first meaning tree to the second meaning tree.

Another aspect of the present invention can include automatically importing NLU training sentences and automatically determining an interpretation of the NLU training sentences according to statistical likelihoods determined from the NLU training corpus of text. Alternatively, NLU interpretations of training sentences automatically can be imported and applied to the NLU training corpus of text. NLU interpretation information resulting from any one of the multi-passes can be displayed responsive to a user input specifying one of the passes. The method further can include ordering text phrases of the NLU training corpus of text in a sentence view according to an attribute of the NLU interpretation information for the text phrases, and sequentially displaying the NLU interpretation information for at least two of the text phrases as meaning trees. The meaning trees can be displayed according to the ordering in the sentence view.

Another aspect of the present invention can include an integrated development tool for developing an NLU application. The development tool can include a database configured to store items of NLU interpretation information corresponding to an NLU training corpus of text. A graphical editor that is communicatively linked to the data base can be included. The graphical editor can include one or more views for manipulating the items of NLU interpretation information. A processor configured to determine the items of NLU interpretation information according to a multi-pass system can be included. The processor also can be configured to store the items of NLU interpretation information in the database.

The integrated development tool also can include a graphical user interface for specifying a search for selected ones of the data items of the NLU interpretation information. The graphical user interface can include at least one list of selectable terminals and non-terminals for specifying the search. An additional area can be included in the graphical user interface for specifying relationships of the selected data items with other ones of the data items.

The graphical editor can include a tree view for presenting the items of NLU interpretation information in a hierarchical tree structure, a dictionary view for presenting individual items of NLU interpretation information in column format, a sentence view for presenting one or more items of NLU interpretation information in sentence form, a split screen view for simultaneously presenting at least two meaning trees, and an import view for importing additional NLU training text and associated interpretation information. A programmable statistical model configured to determine at least one interpretation from the NLU training corpus of text also can be included.

BRIEF DESCRIPTION OF THE DRAWINGS

There are presently shown in the drawings embodiments which are presently preferred, it being understood, however, that the invention is not limited to the precise arrangements and instrumentalities shown.

FIG. 9 is an exemplary graphical user interface for displaying sentences and/or phrases of a training corpus of text.

FIG. 14 is an exemplary graphical user interface for identifying terminals and non-terminals within imported data.

DETAILED DESCRIPTION OF THE INVENTION

The invention disclosed herein concerns a method and a system for building statistical models for use with a natural language understanding (NLU) application. In particular, the invention disclosed herein can provide users with an integrated development tool for building statistical models for use with an NLU system. Rather than using an amalgamation of components including a series of text files, text editors, and keyboard macros to specify meaning and structure of the sentences comprising a corpus of text, the invention provides an integrated development tool (IDT). The IDT can include a database, as well as an assortment of visual (graphical) and audible tools to specify interpretation information which is often specified as annotations to the corpus of text. The NLU interpretation information specifies an interpretation or meaning of the sentences comprising the training corpus of text. The database functionality of the invention, including the invention's ability to synchronize and label user edits, makes the invention particularly suited for use in a networked computing or workgroup environment.

Figure 1:
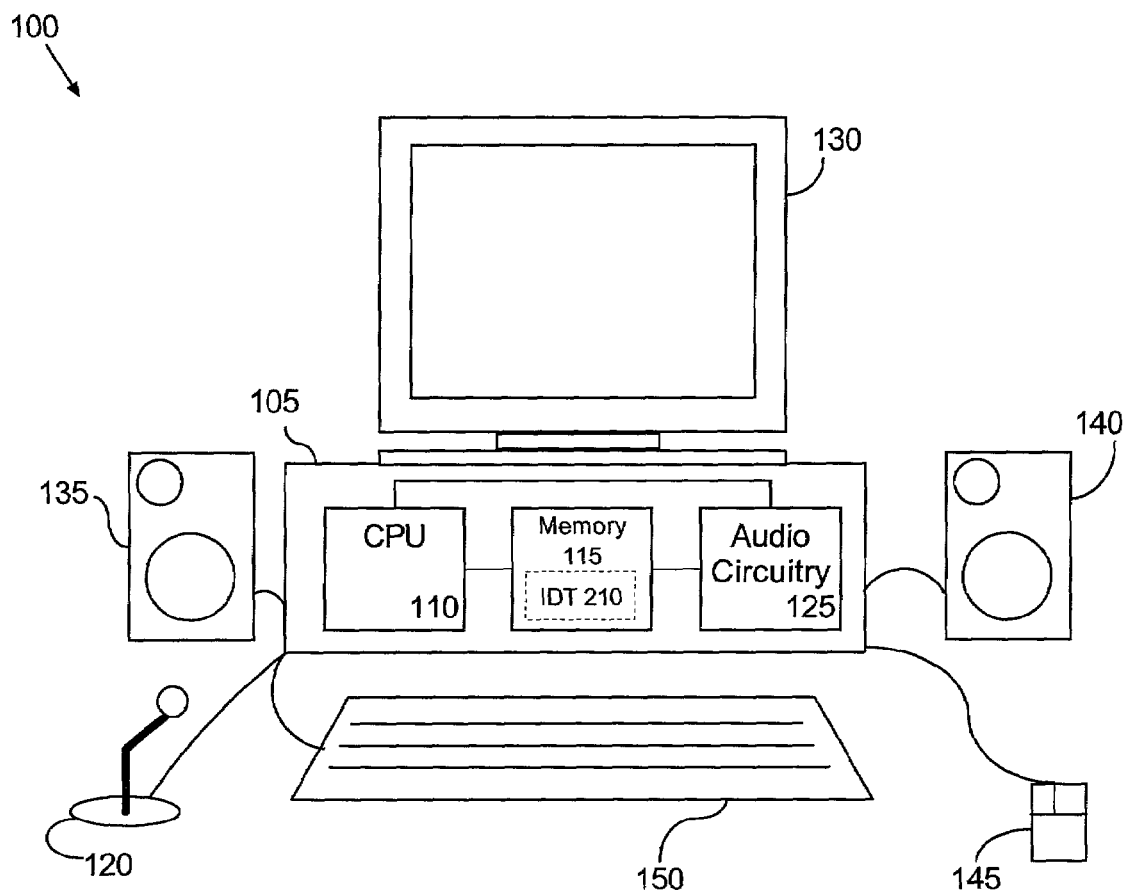
FIG. 1 is a schematic diagram of an exemplary computer system on which the invention can be used.

FIG. 1 depicts a typical computer system 100 for use in conjunction with the present invention. The computer system 100 can include a computer 105 having a central processing unit 110 (CPU), one or more memory devices 115, and associated circuitry. The memory devices 115, which can include the IDT 210, can be comprised of an electronic random access memory and a bulk data storage medium. The computer system also can include a microphone 120 operatively connected to the computer system through suitable interface circuitry 125, and an optional user interface display unit 130 such as a video data terminal operatively connected thereto. The CPU can be comprised of any suitable microprocessor or other electronic processing unit, as is well known to those skilled in the art. Speakers 135 and 140, as well as an interface device, such as mouse 145, and keyboard 150, can be provided with the system, but are not necessary for operation of the invention as described herein. The various hardware requirements for the computer system as described herein can generally be satisfied by any one of many commercially available high speed computers.

Figure 2:
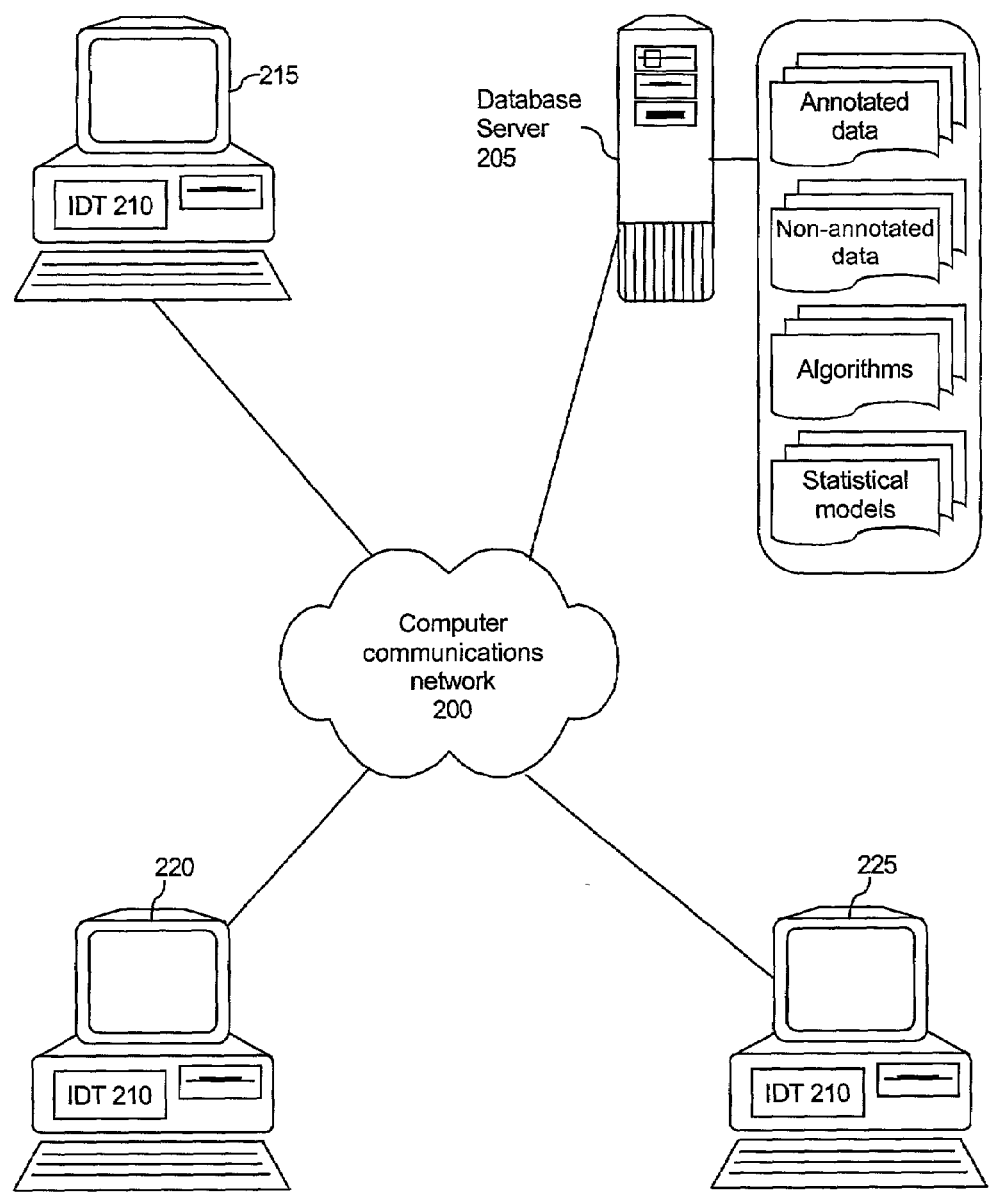
FIG. 2 is a schematic diagram depicting an exemplary system architecture upon which the invention disclosed herein can be implemented.

FIG. 2 is a schematic diagram depicting an exemplary system architecture upon which the invention disclosed herein can be implemented. As shown, the system architecture can include several computer systems 215, 220, and 225, each of which can include an IDT 210 executing in a suitable operating system. The computer systems 215–225 can be communicatively linked to one another and the database server 205 via the computer communications network 200. Thus, although each of the computer systems 215–225 can include a self contained IDT 210, having a complete set of annotated and non-annotated data, statistical models, and algorithms, according to one aspect of the present invention, various portions of the data utilized by the IDT 210 can be stored and accessed from the database server 210. For example, various items of information to which multiple users of a workgroup may require access can be stored on the database server 210 rather than on each individual computer system 215–225. For example, as shown in FIG. 2, the database server 205 can store annotated text, non-annotated text, statistical models, algorithms, and the like.

The IDT 210 can include classing and parsing functionality for statistically processing a corpus of text. More specifically, using the IDT 210, a statistical model, including at least in part, of a classer and a parser can be built. Using the IDT 210, the corpus of text can be annotated such that the resulting annotated corpus of text can be organized into component sentences, each having a hierarchical tree-like structure derived from the annotations. The statistical model can be built or trained using the annotated corpus of text. As the statistical model is built or trained, the IDT further can test the current statistical model for accuracy.

It should be appreciated, however, that a multi-pass text processing approach can be followed wherein more than two passes can be used. Accordingly, the output from each pass can serve as the input to a next or subsequent pass. For example, a variety of filters and/or word spotting algorithms can be used, for example a "null filter" for identifying and annotating meaningless words, or a phrase pass that identifies small semantic phrases such as prepositional phrases, noun phrases, and the like. Still, other annotation techniques such as source-channel modeling can be used wherein the resulting annotation is referred to as an alignment and is not a tree-like structure.

Taking the classer and parser example, sentences can be annotated for classes which can be application specific groupings of related text strings such as account types in a financial NLU application. Other classes, such as times and dates can be application independent. Classes can be determined empirically through analysis of the corpus of text such that a classer can recognize particular text strings or words as belonging to defined classes. It should be appreciated that the terminal and non-terminal descriptors, meaning trees, including parse trees and class trees, as well as any other word frequency data or statistical data derived from the IDT tool collectively can be referred to as annotation data. Notably, the annotation data, including any text constituting the corpus of text, can be stored within a database, rather than being stored as one or more text files.

The classer can be constructed using statistical processing methods for identifying substrings in the received text that constitute one of the predefined classes. For example, the classer can be constructed using statistical processing methods where thousands of sentences can be annotated identifying the classes of constituent words or text strings of the sentences. The annotated sentences can be used to train the classer to recognize the classes to which the words or text strings belong within an NLU system. Thus, the classer can be constructed using statistical processing algorithms known in the art, such as minimizing the conditional entropy or maximizing the likelihood that the resulting model predicts the training data to identify key text strings. For example, the NLU system can use a decision tree or maximum entropy model capable of recognizing particular classes of text strings.

From a received portion of text, the classer can produce a simplified resulting text string where the identified members of the classes within the original text string can be annotated with a defined class, effectively replacing the actual text strings with the class name. For example, the classer can process the text string "I want to transfer five hundred dollars from XYZ Fund to ABC Fund" such that the resulting exemplary output can be "I want to transfer AMOUNT from FUND to FUND". Notably, the structure of the text input has been greatly simplified. Specifically, by classing a received text input, the number of resulting input structures, i.e., possible grammatical structures, can be greatly reduced to facilitate subsequent statistical processing. For example, without classing the received text input, the following sentences can be thought of as having different structures:

I want to transfer five hundred dollars from XYZ Fund to ABC Fund.
I want to transfer five thousand dollars from XYZ Fund to ABC Fund.
I want to transfer one hundred dollars from XYZ Fund to ABC Fund.
I want to transfer five hundred dollars from ABC Fund to XYZ Fund.
I want to transfer five hundred dollars from A Fund to B Fund.
I want to transfer five hundred dollars from C Fund to A Fund.

After classing the above text, however, the result indicates that each text input shares a common structure, i.e., "I want to transfer AMOUNT from FUND to FUND". Thus, the presence of different members of a class within a received text input does not cause the text input to be treated as a different structure. Notably, classed sentences can be depicted using a hierarchical tree structure which can be referred to as a class tree. The class tree is one type of meaning tree representing an interpretation or meaning of the corresponding sentence. The hierarchical meaning tree can include both terminal and non-terminal nodes. For example, the leaves of the meaning tree can correspond to words of the processed text and classes. The leaves can extend to one or more non-terminals, each of which can provide further meaning and structure to the meaning tree. Moreover, each of the leaves and non-terminals (as well as terminals) can include a user configurable descriptor. Each leaf can ultimately extend to a root node either directly or through one or more non-terminals.

The parser can receive the processed text output from the classer as input. The parser can process the received text to add additional non-terminals and/or descriptors corresponding to features, i.e., actions and parameters or other terminal or non-terminal groupings, to the remaining relevant text strings of the received text input. For example, the parser can group particular key words. In determining these features, the parser can utilize statistical processing methods as previously mentioned in describing the classer. For example, the parser can process the text output from the classer to determine a parse tree for the text string. The parse tree of a text string can be a hierarchical representation of a natural language text input comprised of the classes, actions, and parameters of the received text string flowing from the general to the specific extending down to the terminal or word level. The parse tree can be depicted in graphical form where the highest level used to identify the text string serves as the root. More detailed non-terminals can lie beneath the root extending down to the terminal level wherein each non-terminal and terminal is a node of the parse tree. The parse tree of a sentence typically is more complex than the class tree corresponding to that sentence. Still, both parse trees and class trees can be called meaning trees.

The IDT 210 can include a variety of pre-built statistical models. For example, statistical models referred to as taggers or classers for processing widely used phrases such as dates, times, amounts, or other classes of phrases or expressions can be included within the IDT. Such statistical models can include classing and parsing models. Thus, for any corpus of text imported or read by the IDT 210, the IDT 210 can automatically analyze the imported corpus of text to identify indicators relating to the pre-built models. The indicators can include terminals corresponding to classes such as dates, times, and other easily replaceable items including pleasantries (i.e. "thank you"). For each indicator corresponding to a particular pre-built model, the IDT 210 can incorporate that pre-built statistical model into the statistical model currently under construction. For example, the IDT 210 can perform a keyword search or use other statistical processing methods previously mentioned to analyze a corpus of text to determine whether a pre-built model has any relevance to the corpus of text. The IDT 210 further can query the user whether to include such a pre-built model, or alternatively, the user can request that such a model be included. In any event, such functionality relieves a user from reinventing statistical models to process constantly recurring text phrases.

As mentioned, the inclusion of a classer and a parser within the IDT 210 represents only one embodiment of the invention disclosed herein. Those skilled in the art will recognize that any appropriate statistical processing method and/or model can be used. For example, other embodiments can include a word spotting algorithm, maximum entropy, rules, or heuristics. In any case, the invention disclosed herein is not limited to the specific embodiment utilizing a classer and a parser.

Figure 3A:
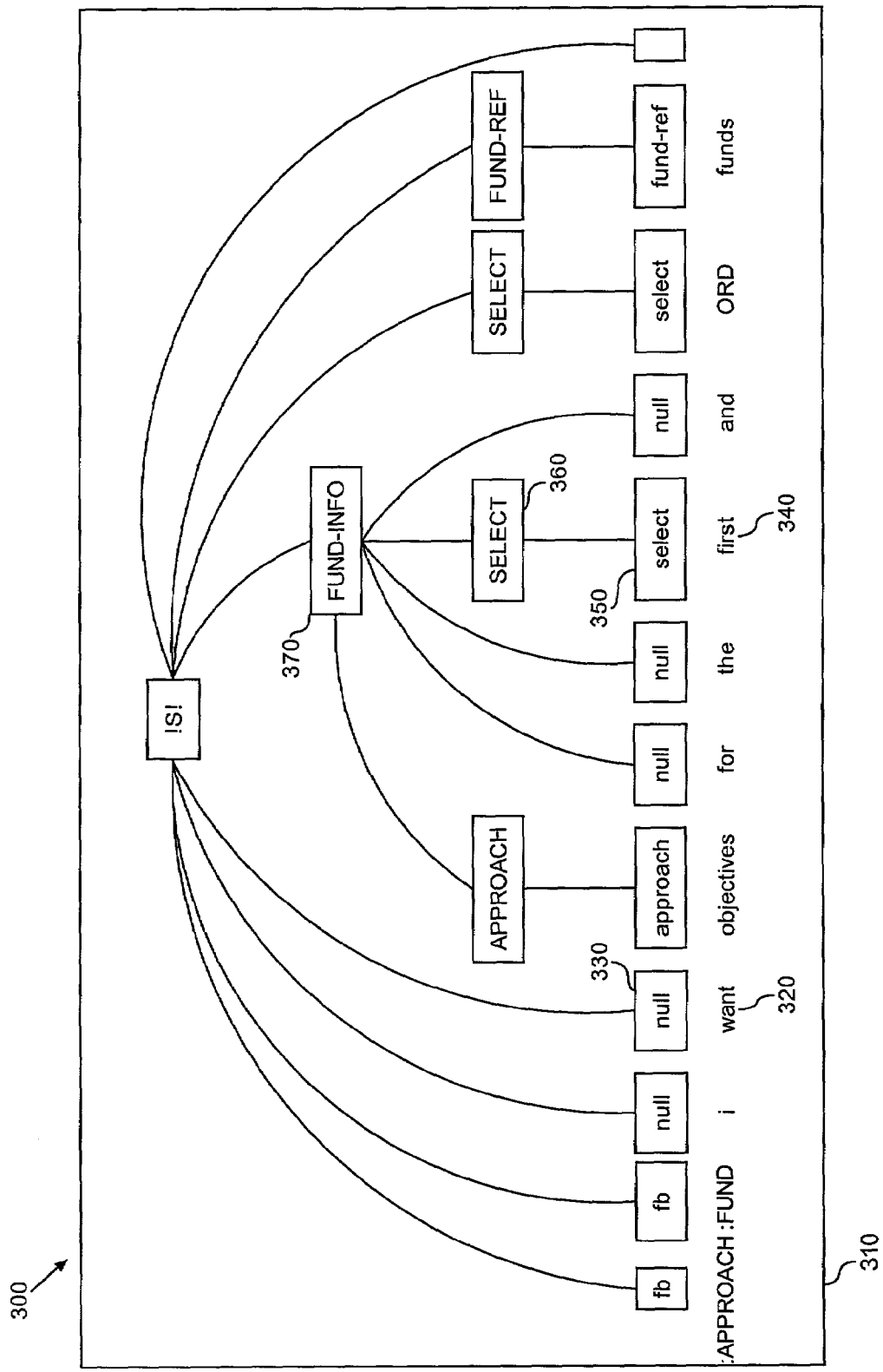
FIG. 3A is an illustration of an exemplary tree view graphical user interface.

As mentioned, the IDT 210 can utilize a database such as a relational database, as well as an assortment of graphical and audible tools to aid users in annotating a corpus of text and developing a statistical model for use with an NLU application. FIG. 3A depicts an exemplary tree editor view presented within exemplary graphical user interface (GUI) 300 of the IDT. The tree editor view provides an intuitive manner of viewing meaning trees which can include both class trees and parse trees. As shown in FIG. 3A, an exemplary sentence from the corpus of text is displayed in tree format. The tree-like sentence structure flows from the bottom up as terminals, in this case words, flow to non-terminals, and non-terminals flow to the root node denoted as "!S!". Notably, non-terminals can flow to other non-terminals to accommodate multiple levels of sentence structure. In some instances, terminals can flow directly to the root node. In any case, the descriptions corresponding to the terminal and non-terminal data items are completely configurable. Specifically, an NLU system designer can determine an appropriate set of terminal and non-terminal data items (and corresponding descriptions) to specify meaning and context. These user configured terminal and non-terminal data items can be incorporated within the IDT.

For example, FIG. 3A depicts a series of terminal and non-terminal data items dealing with an NLU system tailored to work in conjunction with a financial system. The terminal and non-terminal data items are organized in a tree structure wherein the root of the tree is at the top of the structure. From the root node, parent nodes branch to child nodes, wherein those child nodes serve as parent nodes to other child nodes. The tree structure continues downward until actual words of the corpus text are reached. For example, as shown in FIG. 3A, the word "want" 320 has been annotated with the terminal "null" 330. Notably, the "null" terminal can be applied to words which have been identified as not conveying much, if any, contextual information or meaning with regard to the sentence. Also, the word "first" 340 has been annotated with the terminal "select" 350, which flows to its parent, in this case a non-terminal "select" 360. The "SELECT" non-terminal 360 flows to a parent node, which is another non-terminal "FUND-INFO" 370. Thus, the "SELECT" non-terminal node 360 of the meaning tree is a child of "FUND-INFO" and a parent to "select". "FUND-INFO" then flows to the "!S!" denoting the root node and highest level of the text sentence. The terminal and non-terminal names are completely user configurable. For example, if the statistical model were designed to work in conjunction with a travel reservation system, the terminals and non-terminals can be configured by the application developer or user to represent application specific word groupings. In that case, examples can include, type of vacation, departure date, arrival date, trip duration, and the like.

For un-annotated sentences, the IDT can complete a parse tree or a class tree using default terminals and non-terminals annotators. If a default non-terminal annotator is a "null", the IDT can query the individual words stored in memory and choose another suitable or likely non-terminal. Still, the IDT can use a previously specified non-terminal annotator for a particular word rather than the default non-terminal.

For partially annotated sentences, the IDT can automatically complete a parse tree or a class tree for that sentence. In that case, the IDT can search for a sentence from memory having a determined parse tree wherein the sentence resembles the input sentence or partially annotated sentence. Accordingly, the IDT can propose a complete parse tree for the input sentence based upon the stored parsed sentence. In this manner, the IDT can determine a class tree and a parse tree for the text sentence using an auto-complete function. Alternatively, the user can manually build a meaning tree using the IDT by inserting terminals and non-terminals and connecting the nodes with appropriate branch lines.

Interpretation data can be edited graphically using the tree editor view in a number of ways. For example, the words comprising the corpus of text can be edited, terminals and non-terminals can be edited, and branches can be edited in the tree editor view. Each of the aforementioned edits can be performed using conventional pointer control actions such as drag and drop, left and right clicking, and double clicking actions. For example, a node of the tree can be edited to point to a different parent by selecting that node and dragging and dropping the node over the new user intended parent. This action un-links the selected node from the previous parent and links the node to the new parent. Further, the user can draw the branches of the tree manually or use a variety of functions within the IDT to draw the branches so that the resulting shape of the tree has a readable structure. The IDT can include a setting which prevents any tree branch from overlapping or crossing another tree branch. The user can select branch angles and straight or curved branches so that the resulting shape of the tree has a readable structure. Additionally, the text, size of the text, the fill colors, and fill patterns can be user configurable. It should be appreciated that valid trees within the system must contain words that ultimately connect to a root symbol such as "!S!" or some other symbol representative of the root node. Accordingly, the IDT can include safeguards which disable particular edit controls or actions which would result in an invalid tree structure.

Figure 3B:
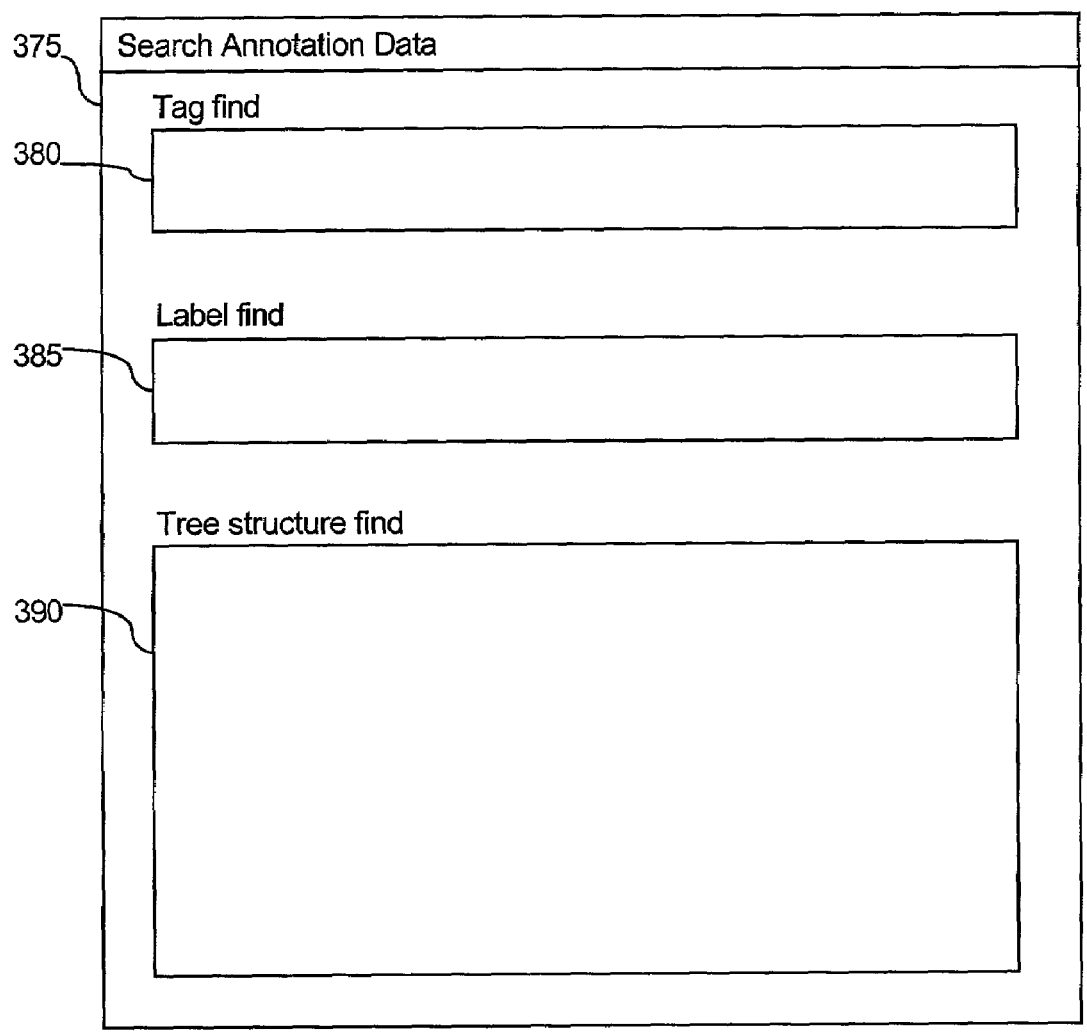
FIG. 3B is an exemplary graphical user interface for searching natural language understanding interpretation information.
Figure 4:
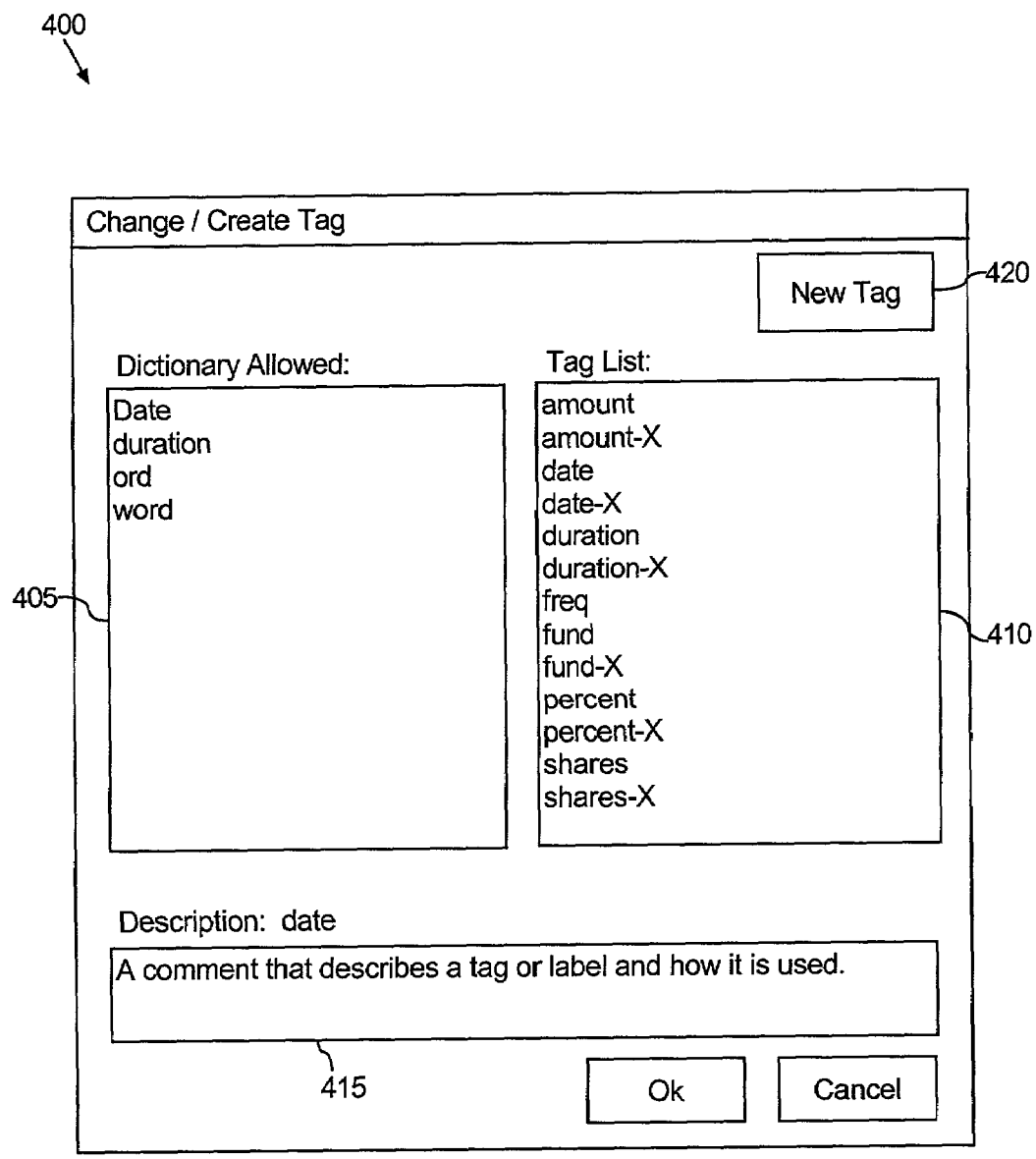
FIG. 4 is an exemplary graphical user interface for modifying and creating tags.

FIG. 3B is a schematic diagram illustrating an exemplary GUI 375 for implementing several different find functions in accordance with the inventive arrangements disclosed herein. As shown, a GUI 375 can be provided which enables users to search text annotations and structure in a variety of different ways. Specifically, users can search text annotations for particular tags using field 380, for particular labels using field 385, and for particular tree structures and/or sub-structures using field 390. For example, a user can draw a small segment of a larger tree structure and search the annotation data for structures resembling the tree structure specified in field 390.

The tree structure itself can be used to search for other related or matching structures. Specifically, the IDT allows a user to select a portion of a meaning tree. Once selected, the user can instruct the IDT to search other meaning trees for a structure matching the selected structure. For example, the user can use a mouse to draw a box around tree nodes having a structure which the user wishes to locate elsewhere within the corpus of text. Items or nodes of the meaning tree falling within the user drawn box can be selected. Once selected, the IDT can search the annotated corpus of text using the database functionality to locate a matching structure. It should be appreciated that other methods of selecting tree nodes can be used such as different combinations of keyboard keystrokes. Accordingly, the invention is not so limited to the particular method of selecting the meaning tree structure.

An exemplary GUI 400 can be provided for editing or creating both terminals and non-terminals. Hence, although the following discussion refers to non-terminals, it is applicable to both terminals and non-terminals. The user interface allows a user to describe a new non-terminal (also referred to as a tag in some instances). Also, the definition of an existing non-terminal can be edited. To invoke this function, the user can select a word for which a non-terminal is to be created or edited, and issue a user command to edit or create the non-terminal. Field 405 is a "Dictionary Allowed List" which can take an intersection of all parent and child nodes of one or more selected tree nodes and present the intersection to the user as possible label choices for the selected words or nodes. In addition, within the intersection of nodes, the Dictionary Allowed List can take into account the manner in which previous parent and child nodes have been organized within other meaning trees, as well as other historical information relating to the direction of branches extending from, and connecting to the parent and child nodes. In one embodiment of the invention, an auto mode can be provided. In auto mode, if the Dictionary Allowed List contains only one possible terminal or non-terminal, the IDT automatically can select that terminal or non-terminal to be applied to the user selected word or group of words.

Field 410 is a dictionary field of GUI 400 which can present the user with all terminals or non-terminals defined in the system. Regardless of the list used by the user to select a terminal or non-terminal, the description field 415 can provide the user with information regarding the appropriate use of the selected item. The description field 415 can aid a user in learning the proper and intended use of a particular terminal or non-terminal. For example, the description itself can be displayed by the IDT as a tool tip when the user moves a pointer over a terminal or non-terminal in the tree editor view. This can be particularly beneficial in cases where a new developer joins an existing NLU development team and must be educated on the annotation methodology used by that development team.

Figure 5:
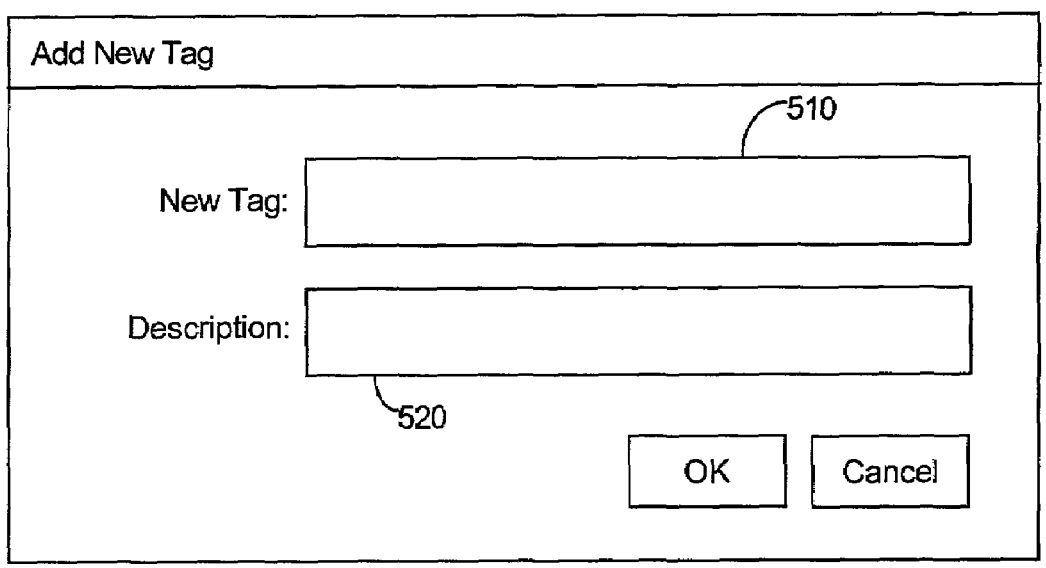
FIG. 5 is an exemplary graphical user interface for defining new tags.

If the user wishes to enter a new terminal not yet defined in the IDT, the user can select the "New Tag" icon 420. In that case, FIG. 5 depicts an exemplary GUI 500 which can be displayed by the IDT responsive to activation of icon 420. The exemplary GUI 500 of FIG. 5 allows the user to input a new terminal or non-terminal in field 510 and an accompanying description in field 520.

Figure 6:
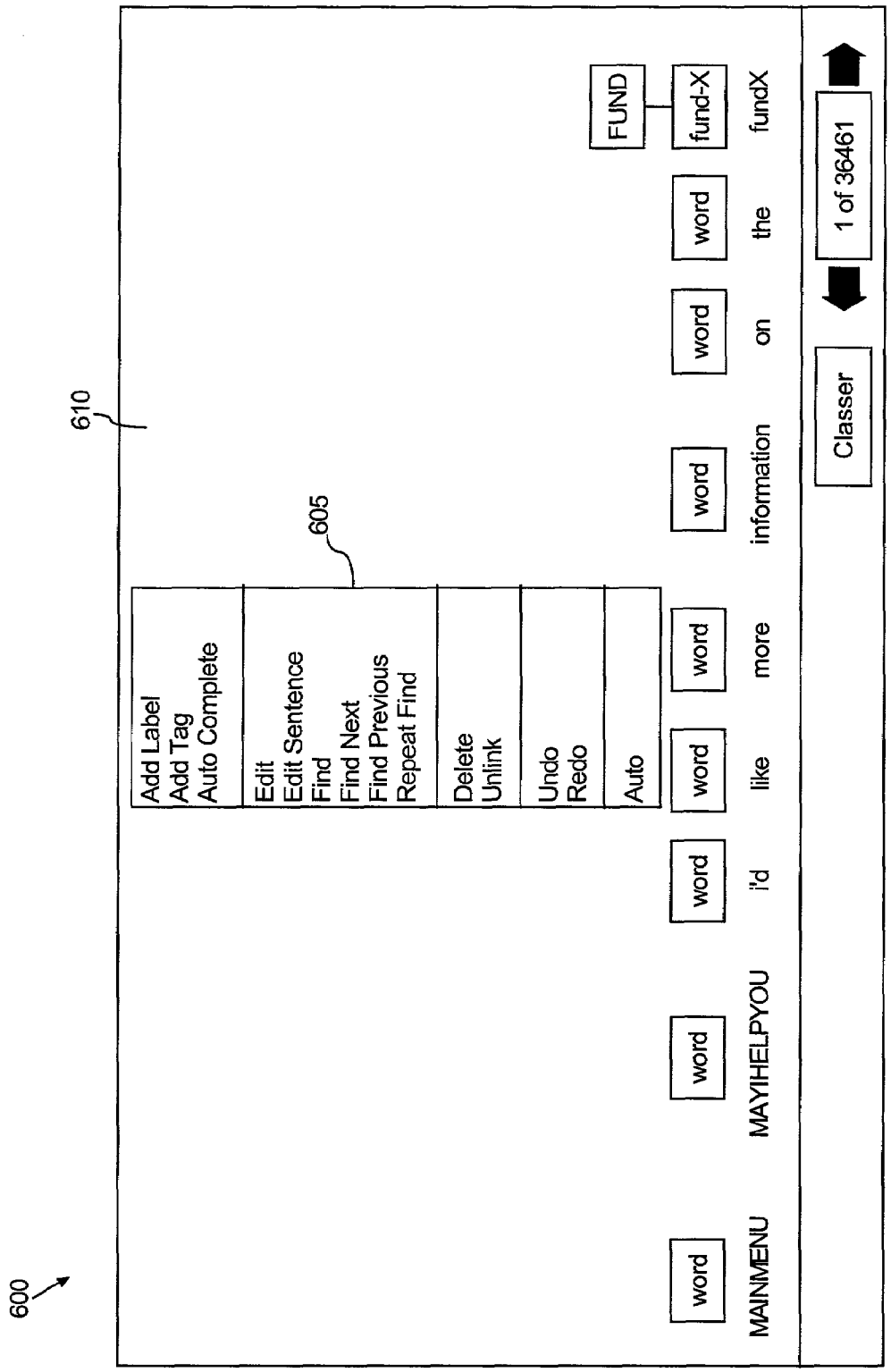
FIG. 6 is an exemplary graphical user interface illustrating a meaning tree view.

FIG. 6 depicts another exemplary GUI 600 for presenting a tree editor view similar to the GUI of FIG. 3A. As shown, the exemplary GUI 600 contains an exemplary pop up menu 605 accessible within window 610 of GUI 600. Notably, much of the aforementioned functionality can be directly accessed from the pop up menu 605. For example, the user can add additional non-terminals, choose to automatically complete the parse tree, including classing of the sentence according to the statistical model specified in the configuration file, edit a node of the tree, find a word structure or entire sentence structure, as well as delete or undo an action. Also, as shown, the "Add Tag" functionality is disabled because each word already has been annotated with a corresponding tag. Notably, in this embodiment of the present invention, the terms tag and label are used in relation to particular terminals or non-terminals. For example, tags are assigned to words, and labels can be used to assign structure to tag groupings. Accordingly, only labels are available to complete the parse tree to the root node.

Figure 7:
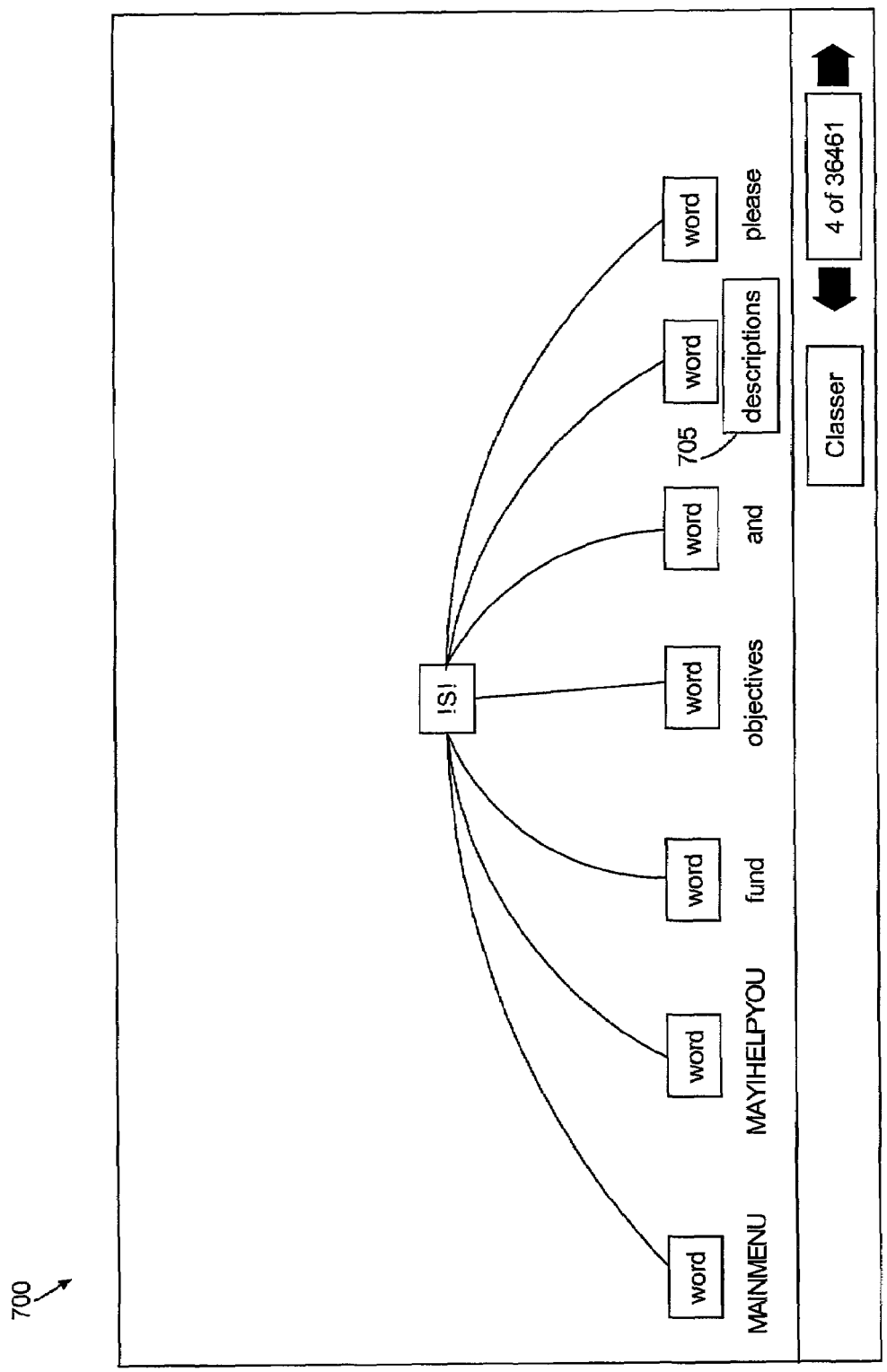
FIG. 7 is another exemplary graphical user interface illustrating a meaning tree view.

FIG. 7 depicts another exemplary GUI 700 for presenting a tree editor view. In this case, a user has chosen to edit a word of the corpus of text shown in the tree editor view. Notably, the user has selected a word of the training sentence and chosen to edit that word. The new word "descriptions" 705 has been entered in place of the previous word. Thus, the user can edit the actual corpus of text as well as the terminals, non-terminals, and tree structure from any of the IDT's tree editor views. Notably, in this case, changing a word of the tree does not change the tree shape, but rather replaces the old word with the new user specified word. Further, the IDT can check whether a sentence from memory matches the edited sentence. If so, the user can be queried as to whether to use the existing tree or replace the existing tree with the newly edited tree.

Figure 8:
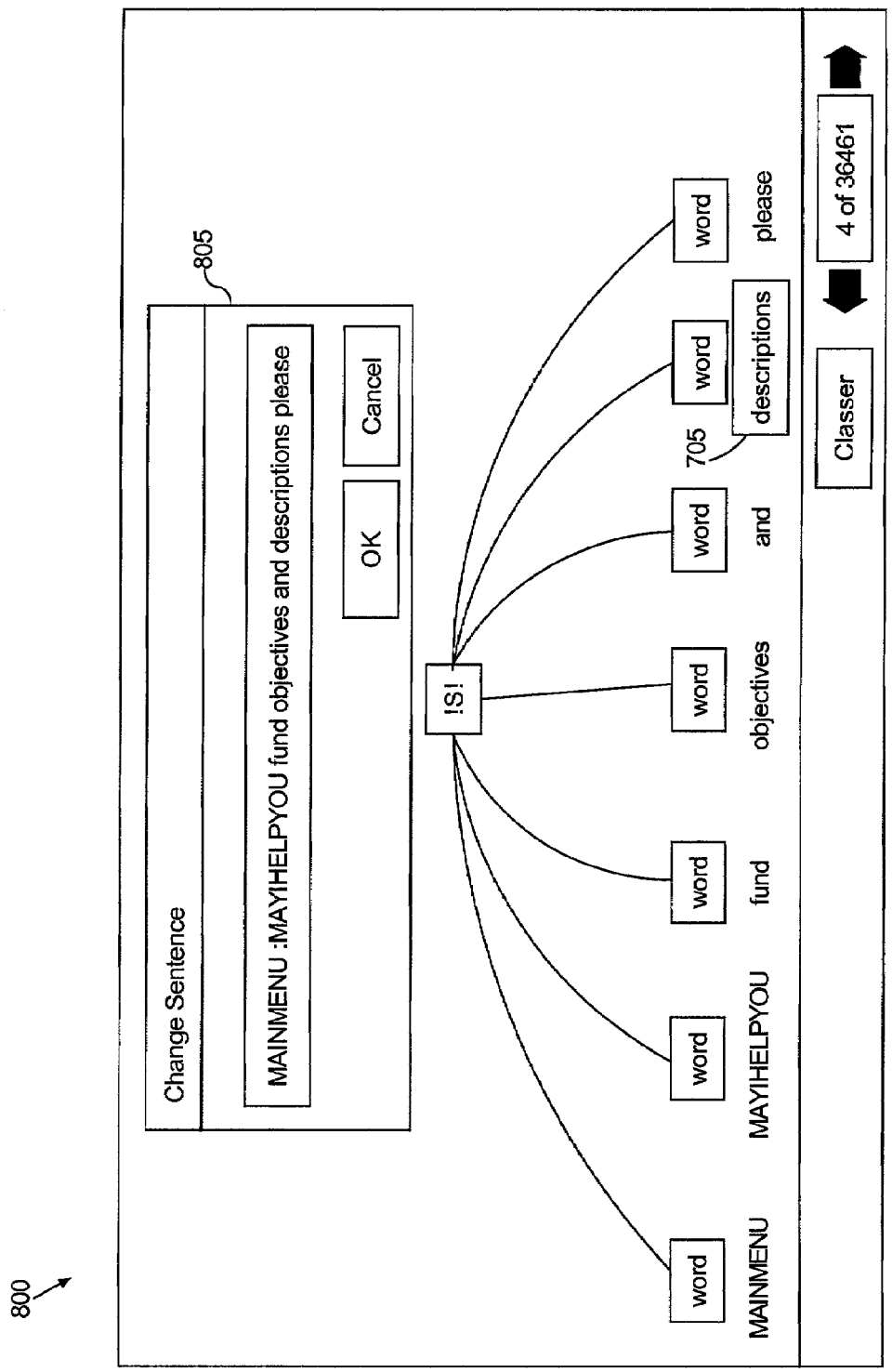
FIG. 8 is an exemplary graphical user interface for modifying text in a meaning tree view.

FIG. 8 depicts another exemplary GUI 800 for presenting a tree editor view in which the user has invoked a change sentence function. Responsive to such a user request, the IDT can display exemplary GUI 805 in which the user can edit an entire training corpus sentence from within any of the tree editor views. Notably, as the user edits the sentence, any parse tree, class tree, and other interpretation information which no longer corresponds to the sentence as edited, can be updated in the database. The IDT can search existing sentences to determine whether another sentence matches the newly edited sentence. If so, the class tree and parse tree data of the matching sentence can be associated with the newly edited sentence. This functionality further allows users to correct errors introduced into a corpus of text when that corpus is read or processed using one of several options to be discussed below.

FIG. 9 depicts an exemplary GUI 900 which can be used to display the words comprising the base of a tree. The sentences can be listed in field 925 wherein the information can be organized according to several different column fields. Specifically, column heading 905 can be used to display the number position of the individual sentence within the corpus of text. Column heading 910 can be reserved for displaying the count, or number of times in which that exact text appears within the corpus of text. Column heading 915 can display feedback tags which precede the sentence as well as the text of the sentence. The feedback tags can indicate a form name and slot name to which the sentence corresponds. The feedback tags can be listed in a separate column or can precede the text of the sentence. Further, the user can switch to another view by activation of the button 920 which places the IDT in a mode to class sentences. As shown, the class names or tags have been incorporated within the sentences. Notably, the same GUI style can be used to present both parsed or classed sentences to the user. Accordingly, the words of the sentence can be replaced with terminals or non-terminals as the case may be.

The listed sentences can be sorted in ascending or descending fashion according to the sentence number column, the count number column, or the text column. GUI 900 also can include a column indicating the number of words contained within each sentence. This information allows a user to select shorter sentences to begin classing or parsing. It should be appreciated that the sentences can be sorted ascending or descending order and can be searched or filtered based upon any of the column categories.

The displayed columns included within GUI 900 can be user configurable according to any data that is tracked by the IDE. For example, additional columns specifying the feedback tags, prompts, parse tree scores, or application forms corresponding to a given sentence can be included. A column indicating the rank of the annotation of the sentence as determined by the parser or classer can be included. For example, a rank of 1 can indicate the highest likelihood that the model predicts the correct answer. The higher the rank, the less likely the model predicts the correct answer. A status column can be included which can indicate whether a sentence is used for training or smoothing. Information indicating how the sentence was collected such as grammar generated, typed by a user, spoken during pilot testing, spoken during a system test, spoken during deployment, or the like also can be included. In any event, the aforementioned list is not meant to be exhaustive.

Figure 10:
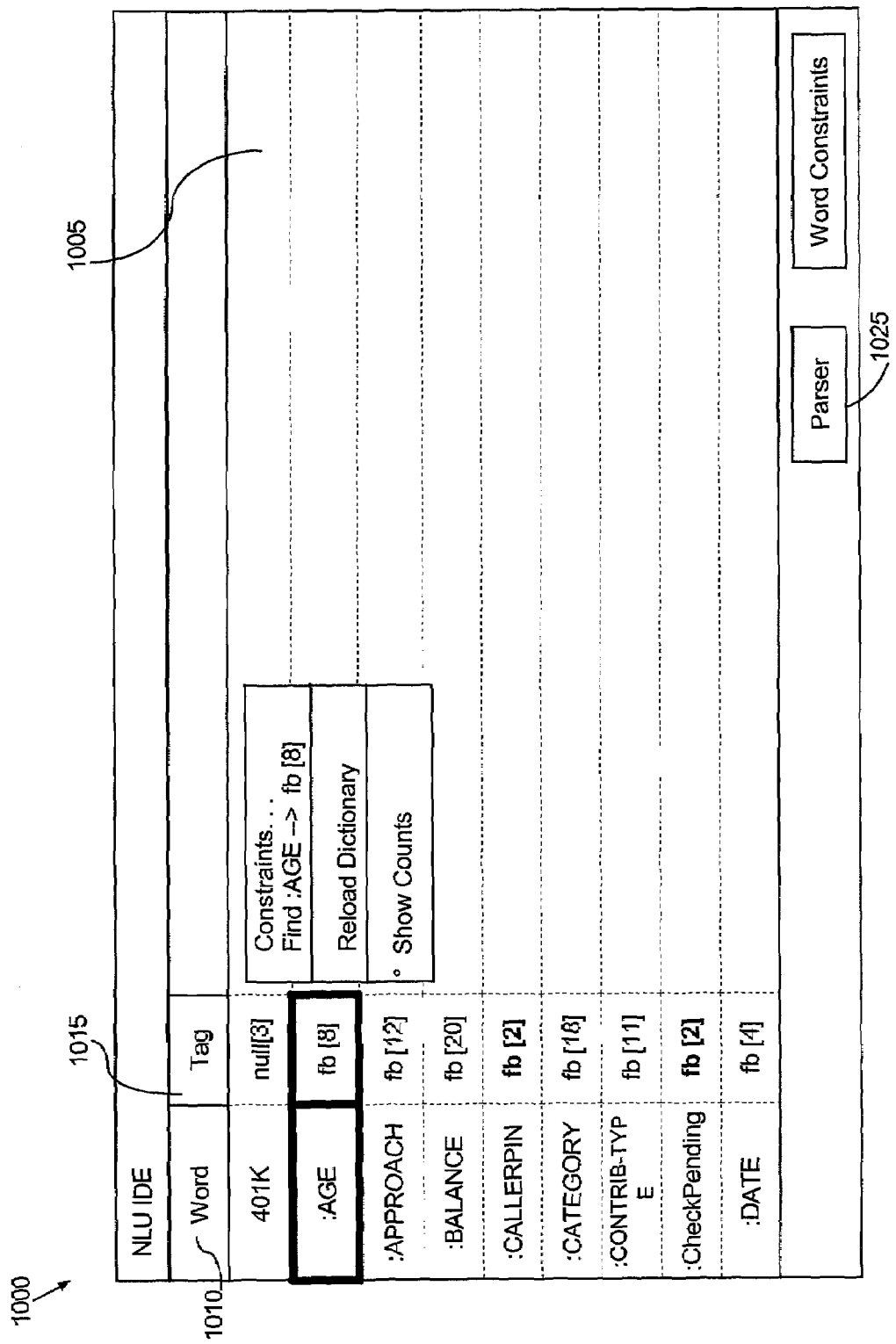
FIG. 10 is an exemplary graphical user interface for displaying terminal and non-terminal data items in a dictionary style view.

FIG. 10 depicts an exemplary GUI 1000 which can be used to present a dictionary style word view. This view can be used to display the complete list of terminals, non-terminals, or annotated words. The display can be configured such that the terminals and non-terminals not used within a particular corpus of text need not be displayed. Notably, the user can toggle back and forth between a class view and a parse view by activating the activatable icon 1025 which further indicates the present view. In this case the view is the dictionary parser view. Un-annotated words can, but need not, be displayed in the word view. As shown in FIG. 10, the word view of window 1005 can be subdivided into at least two headings. The headings can include a word heading 1010 and a terminal or non-terminal heading 1015. In the terminal or non-terminal heading 1015, the bracketed number can indicate the number of times the data appears in the corpus of text. The user can enable or disable the counts as well as adjust the color and font of the items in GUI 1000. Also, the IDT allows a user to differentiate between low count and high count items. For example, the IDT can represent low count items in one color while high count items can be represented using a different color. Further, if the count of a particular terminal or non-terminal is below a particular programable threshold value, the system can indicate that more data is needed to increase the statistical accuracy of the terminal or non-terminal. In one embodiment, particular items of information can be highlighted based upon statistical or heuristic information deemed relevant by the developer.

The exemplary GUI 1000 also can be used to display the manner in which terminals extend to non-terminals. For example, the terminals can be located in the column beneath column heading 1010; and the non-terminals can be located in the column beneath the column heading 1015. In the dictionary tag view, the direction of the branch extending from the particular node to the parent node can be displayed. For example, using a pointing device, if the user right clicks on a particular non-terminal, the IDT can display the direction of the branch extending from the child node to the parent node. Possible directions can include unary, left, middle, right, up, or down.

The exemplary GUI 1000 further can be used to display the manner in which non-terminals connect to other non-terminals. In that case, the view can be similar to the tag view with the exception that labels can be located in both columns because labels can connect to other labels. In any case, the GUI 1000 can be user configurable. In one aspect, the ordering of the columns can be determined by the user. For example, the tag column and accompanying number information can be displayed to the left of the word column. Similarly, a column to the left of the word column can display the total number of times a word appears in a corpus of text. To the right of the word column, a number can be displayed which indicates the number of times the word is tagged as a particular tag or the root. Regardless, it should be appreciated that the column ordering, as well as the inclusion of additional columns for displaying further interpretation information is user configurable.

Another embodiment of the dictionary style view can present the user with interpretation information, and specifically terminal and non-terminal information, similar to a directory tree structure. In that case, tags can be presented graphically as roots, wherein labels can be depicted graphically as collapsible substructures beneath the roots. Further, non-terminals which connect to other non-terminals can be depicted graphically beneath their parent non-terminals. Users can click on a terminal or non-terminal to expand and view the underlying structure, or click on a terminal or non-terminal to collapse the underlying structure. The directory tree view can provide users with an intuitive graphical representation of the overall hierarchy of terminals and non-terminals as they are being used within the statistical model under construction.

A find feature can be included in the dictionary view wherein users can search for a data item having a particular entry. For example, users can search for particular tags or labels, as well as search for tags or labels by parameters such as the number of times a tag or label occurs within the annotation data. The search function also can search for a user specified relationship between a terminal and non-terminal. For example, users can search annotation data for any nodes, parent and/or child, having a branch extending from or arriving at the node from a particular direction such as right, left, up, or unary.

A filter feature also can be included in the dictionary view. Through the GUI 1000, a user can filter the displayed information according to parameters such as a data item source, a data item target, a direction associated with a data item, or an annotator associated with a data item. Users also can filter data according to annotation status indicating whether the data is annotated or un-annotated, a node count indicating whether a child node has greater than "N" annotated examples as parents, a data file where only relationships from particular data files are displayed, a sentence range for displaying relationships derived only from particular sentences, and a usage status for displaying relationships from training, smoothing, and/or test data.

Figure 11:
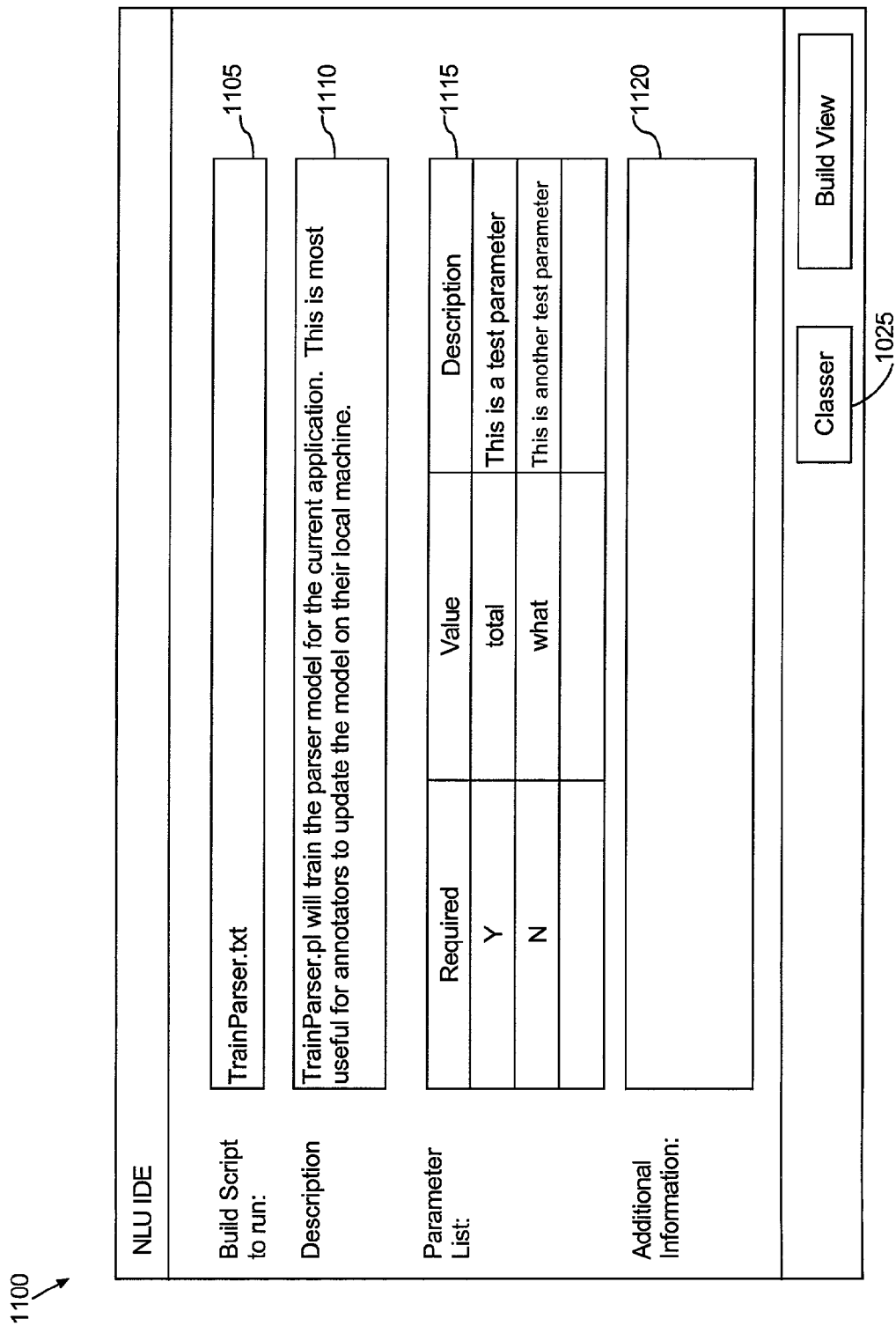
FIG. 11 is an exemplary graphical user illustrating a build view and component of the invention disclosed herein.

FIG. 11 depicts an exemplary GUI 1100 which can be used in conjunction with a build component of the IDT. The exemplary GUI 1100 includes several fields for specifying a script which can be run to "build" an NLU application. Field 1105 can be used to specify a particular file which can specify default parameters, other specialized parameters, the script to be executed, as well as information to be displayed after the script has been executed. The file further can specify a text file to be processed and used during regression testing. Description field 1110 contains a description of the functionality of the script. Parameter list field 1115 can display a list of parameters which can be used for execution of the script. Field 1120 can be used to convey any additional information or remarks which can be relevant to the script. Notably, the description field 1110 and the additional information field 1120 can be useful in a development environment in which a team of users or application developers are developing an NLU application.

Figure 12:
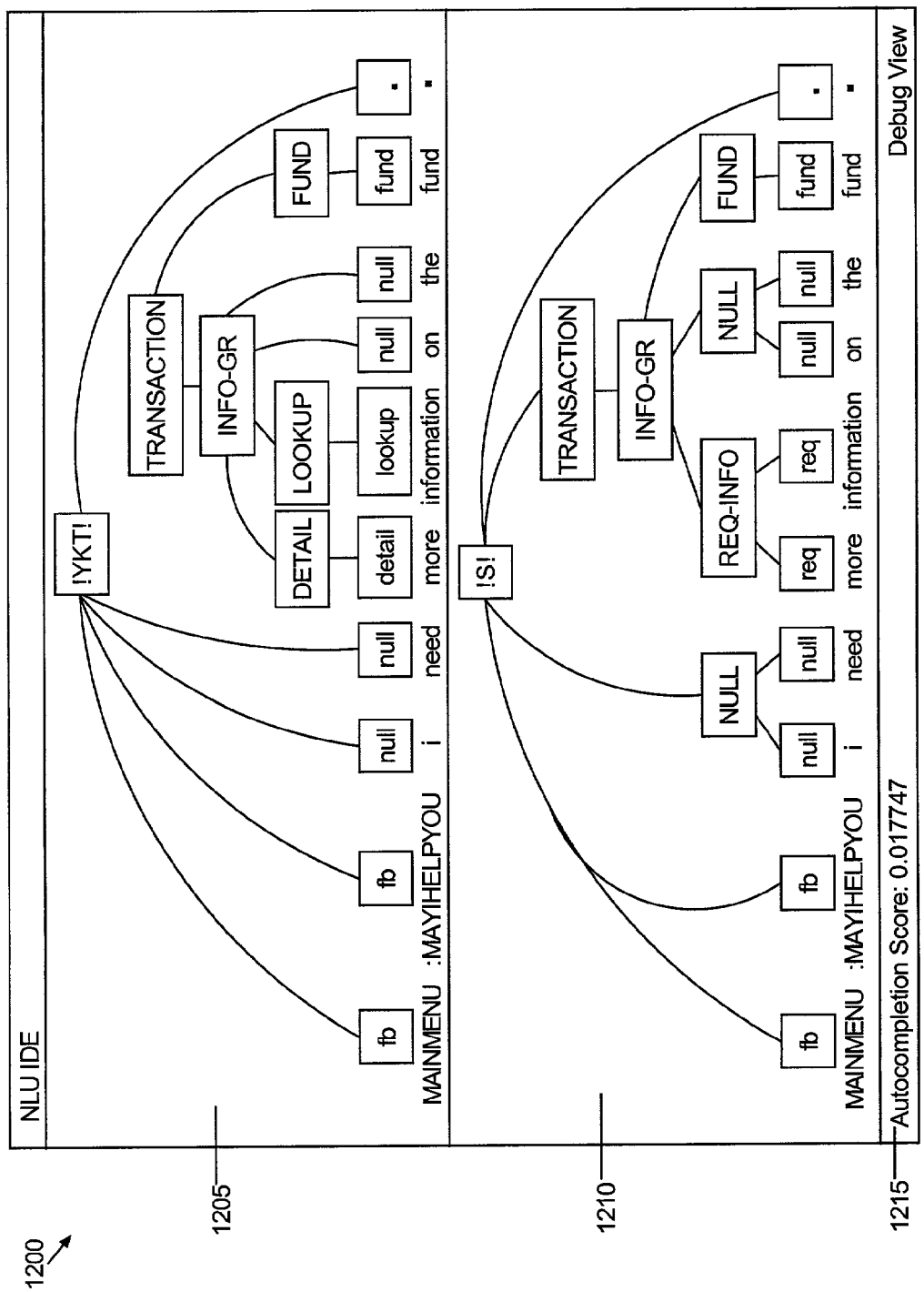
FIG. 12 is an exemplary graphical user interface for displaying more than one meaning tree.

FIG. 12 depicts an exemplary GUI 1200 which can be used in conjunction with the regression test component of the IDT. Notably, the GUI 1200 can be subdivided into two portions. Field 1205 can display the truth meaning tree as determined from the user's annotations of the corpus of text. Field 1210 can display the meaning tree generated by the IDT using the statistical model specified in the configuration file which was previously specified in field 1105 of FIG. 11. Accordingly, more than one statistical model can be specified in the configuration file thereby allowing the results of each statistical model to be compared. For example, the GUI can include a third portion wherein the GUI has one portion for each statistical model used during the regression test and another for the truth. Differences between the two trees can be highlighted automatically. Greater emphasis can be given to the differences that cause the probabilities to differ the most, thereby leading to the incorrect result. Accordingly, the user can be provided with hints as to where to start debugging. The user can visually note differences between the illustrated meaning trees.

The user can cycle through the resulting meaning trees, in this case parse trees, one by one. For example, the user can cycle through the top "n" choices as denoted by the confidence score corresponding to each parse tree. It should be appreciated that the confidence score provides an indication, as interpreted by the IDT, of how closely a resulting parse tree reflects the underlying statistical model, rather than the truth. There can be a correspondence between resulting parse trees having high confidence scores and the resulting parse trees which closely match the truth. Notably, one of the top "n" choices can be a statistical model that matches the truth. Regardless, the user can cycle through possible interpretations to find one that can be a base point for future edits, especially in the case where the truth is incorrect.

Also shown in FIG. 12 is an autocomplete score 1215 which informs the user of the confidence score of the model being displayed to the user. Additional information such as the confidence score of each node or text corresponding to each node can be displayed within the nodes or can be displayed as a tool tip when a pointer is located over the node of the meaning tree. In one embodiment, the nodes can be expandable to accommodate increased interpretation information. Nodal confidence scores can aid developers in detecting errors or in determining why a particular parse tree did not approximate or match the truth. It should be appreciated, however, that the IDT is configurable such that any of a variety of meaning tree characteristics and settings can be displayed as a tool tip or within the node. The GUI 1200 also can present a message should the correct annotation have a score greater than the best scoring answer derived from the model. In that case, the model is predicting the correct answer, and the search mechanism of the statistical model is causing a problem. This is generally fixed by widening the search, and does not require any direct developer debugging.

The GUI of FIG. 12 further can be used to show different stages of annotation data for a same sentence. In particular, annotation data resulting from a first pass, for example a parsing pass, can be displayed in one window, while annotation data resulting from a second pass such as a classing pass, can be displayed in another window. The split screen GUI 1200, however, also can display different sentences. For example, one window can be used to preserve a view of a sentence, while the second window can be used to search for another sentence having a particular structure.

The split screen GUI 1200 also can be used to show two different annotations for the same textual sentence, but with different contexts. For example, the phrase "what's available" takes on different meanings when said in response to "how may I help you" or "what fund would you like the price of", or "how much would you like to withdraw".

Figure 13:
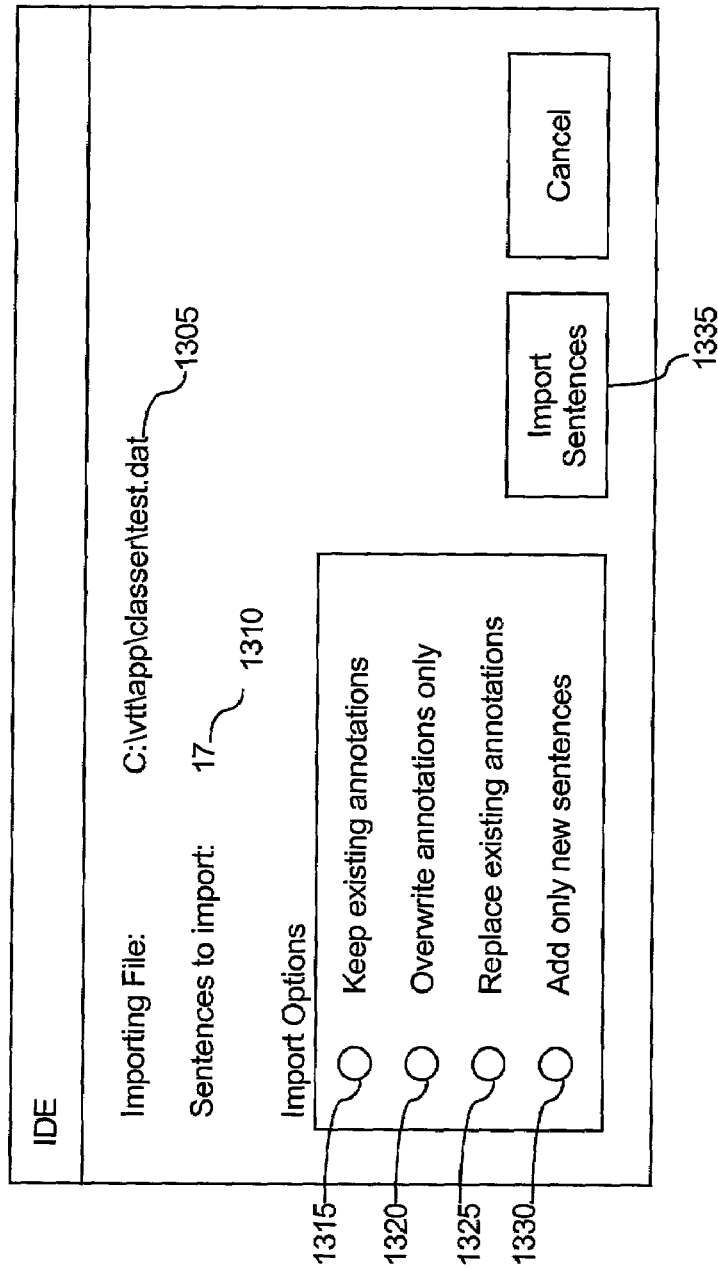
FIG. 13 is an exemplary graphical user interface for importing data.

FIG. 13 depicts an exemplary GUI 1300 which can be used in conjunction with an import component of the IDT. The import component can import an existing corpus of text using any of several methods. For example, a corpus of text can be imported as an un-annotated text file of sentences or an annotated text file. Additionally, because, conventional NLU systems can store user responses, the logs of NLU systems can be data mined to obtain parser output, classer output, or language model text. Each of the aforementioned data types can be imported into the IDT. In another embodiment, users can type text sentences directly into the IDT one by one using the dictionary style views or the tree views.

Still, another embodiment can receive a digital audio file containing user spoken utterances representative of a corpus of text. Alternatively, the IDT can digitally record an analog audio source via an analog to digital converter such as a sound card. Regardless, the IDT can include a speech recognition system for converting user spoken utterances to text to derive a training corpus. In that case, the digital recording of the corpus of text can be stored in memory for future use and analysis, as well as for playback during use of the IDT. Audio files representative of a training corpus of text can be associated with particular text phrases or sentences so that a user or developer can listen to an audio representation of training text as well as view annotation information relating to the text. For example, a portion of text, whether the text is annotated, un-annotated, classer output, or parser output, can be associated with an audio file by specifying the audio file location and the filename. Alternatively, an audio file can be specified and the developer can type associated text into the IDT.

GUI 1300 can be used to adjust the import component settings when importing a corpus of text. Field 1305 can be used to display the name and path of the file being imported into the IDT. Notably, the file can be an annotated corpus of text, an un-annotated corpus of text, and/or a speech file, including a digital recording of speech to be processed, or a text file derived from a speech recognition engine. Field 1310 can indicate the number of sentences recognized by the IDT within the file to be imported. Controls 1315, 1320, 1325, and 1330 determine the type of importation, or rather which sentences and corresponding annotation data will be incorporated within the current statistical model being built in the IDT. For example, activation of control 1315 results in the IDT adding all sentences. If the sentences are already contained within the database, the IDT can use the tree structures defined within the IDT for the imported sentences. Activation of control 1320 will not import any sentences, but will overwrite the annotation data contained within the IDT with the annotation data corresponding to the duplicate sentence within the imported file. Activation of control 1325 adds all sentences despite the fact that the sentences are already contained within the relational database. Control 1325, however, will overwrite the annotation data in the IDT with the annotation data corresponding to the duplicate sentence from the imported file. Activation of control 1330 will add only sentences and annotation data from the imported file which are not contained within the relational database. Activation of control 1335 causes the specified file to be imported according to the aforementioned import criteria.

FIG. 14 depicts an exemplary GUI 1400 which can be used to add terminals and non-terminals located within an imported file to the current statistical model. For example, after importing an annotated text file, the IDT can identify terminals and non-terminals within the annotated imported text file which do not exist within the current statistical model. Thus, GUI 1400 can be presented to a user wherein the new terminals and non-terminals can be presented to the user in window 1405. Notably, an indication in the "Tag/Label" column 1510 can identify the new item as, for example, a tag or a label (terminal or non-terminal). The exact spelling of the particular tag or label can be listed in the "Spelling" column 1415. The "Description" column 1420 can be filled in by a user with an appropriate description of the function or other relevant information concerning the tag or label. Notably, the user can enter text directly into the GUI 1400 to fill in the description column without the need for an extra GUI. Thus, editing of the tag or label description can be performed "in-line" by selecting the description row and column corresponding to the desired tag.

The IDT disclosed herein can be configured by a user to portray interpretation information in any of a variety of ways including various colors, patterns, sounds, and symbols to represent different aspects of the interpretation information. Similarly, the user can customize the terminals or non-terminals used within the IDT. Thus, while the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of developing natural language understanding (NLU) applications comprising:
   determining NLU interpretation information from an NLU training corpus of text using a multi-pass processing technique, wherein alteration of one pass automatically alters an input for a subsequent pass, said NLU interpretation information specifying an interpretation of at least part of said NLU training corpus of text;
   storing said NLU interpretation information in a database;
   in a graphical editor, presenting selected items of NLU interpretation information as a meaning tree comprising terminal and non-terminal nodes representative of data items and receiving user specified edits to said NLU interpretation information;
   determining an intersection of selected nodes of said meaning tree from said NLU interpretation information;
   presenting said intersection of selected nodes as choices for adding an additional node to said meaning tree; and
   adding a node above said selected nodes of said meaning tree, wherein said added node is selected from said choices.

2. The method of claim 1, further comprising:
   determining a probability indicating whether a portion of said meaning tree is correct; and
   visually identifying said portion of said meaning tree if said probability does not exceed a predetermined threshold probability.

3. The method of claim 1, further comprising:
   determining a number of occurrences of a substructure of said meaning tree within said NLU interpretation information; and
   visually identifying said substructure of said meaning tree if said number of occurrences does not exceed a predetermined threshold.

4. The method of claim 1, further comprising:
   responsive to a user command, creating an additional node of said meaning tree, said node representing an additional data item; and
   associating said node with a description.

5. The method of claim 4, further comprising: spell checking said associated description.

6. The method of claim 1, wherein a node of said meaning tree is selected, said method further comprising:
   responsive to a user request, displaying a dictionary view comprising a plurality of columns for displaying said node and parameters of said node, wherein said dictionary view includes a data item represented by said node.

7. The method of claim 1, further comprising:
   automatically completing said meaning tree according to predetermined NLU interpretation information selected from the group consisting of a dictionary of data items, and a model specifying text interpretations.

8. The method of claim 7, said automatically completing step comprising:
   determining whether a single data item from said dictionary of data items is associated with a word of said NLU training corpus of text; and
   if so, automatically assigning said data item to said word.

9. The method of claim 1, further comprising:
   displaying selected items of said NLU interpretation information as a tool tip; and
   displaying a probability that said presented meaning tree is a correct interpretation.

10. The method of claim 1, further comprising:
    searching said NLU interpretation information for a specified meaning tree structure.

11. The method of claim 1, said presenting step further comprising:
    presenting said NLU interpretation information in a dictionary view comprising a plurality of columns for displaying parent and child data items, and parameters of said data items.

12. The method of claim 11, wherein said dictionary view includes a column for indicating children of said data items and another column for indicating parents of said data items.

13. The method of claim 12, further comprising:
    sorting said data items according to said child or parent columns.

14. The method of claim 11, further comprising:
    visually indicating data items having a probability or count exceeding a predetermined threshold.

15. The method of claim 11, further comprising:
    hiding data items having a probability or count not exceeding a predetermined threshold.

16. The method of claim 11, further comprising:
    responsive to a user selection of particular data items having an association, searching said NLU interpretation information for a meaning tree comprising terminal and non-terminal nodes representing said association.

17. The method of claim 11, further comprising:
    filtering said NLU interpretation information according to a parameter selected from the group consisting of a data item source, a data item target, a direction associated with a data item, an annotator associated with a data item, annotation status, a node count, a data file, a sentence range, and a usage status.

18. The method of claim 11, further comprising:
displaying histogram information derived from said NLU interpretation information.

19. The method of claim 1, said presenting step further comprising:
in a sentence view, presenting said NLU interpretation information associated with individual text phrases, said NLU interpretation information selected from the group consisting of an annotation status, a phrase count, a designated phrase use, phrase collection information, a correctness probability, and a correctness rank.

20. The method of claim 1, said presenting step further comprising:
presenting said NLU interpretation information as a plurality of meaning trees in a split screen view, said split screen view comprising at least a first window for displaying a first meaning tree and a second window for displaying a second meaning tree.

21. The method of claim 20, further comprising:
while displaying said first meaning tree in said first window, presenting different ones of said meaning trees in said second window responsive to a user request.

22. The method of claim 20, wherein said first and second meaning trees are different interpretations of a same text phrase in a same context.

23. The method of claim 22, wherein said first meaning tree represents a correct interpretation of a text phrase, and said second meaning tree represents a predicted interpretation of said text phrase according to a statistical model.

24. The method of 23, further comprising:
if a score of said correct interpretation is greater than a score of said predicted interpretation, indicating that said statistical model is incorrect.

25. The method of claim 20, wherein said first and second meaning trees are different interpretations of a same text phrase in two different contexts.

26. The method of claim 20, wherein said first meaning tree corresponds to a text phrase after a first processing pass, and said second meaning tree corresponds to said text phrase after a subsequent processing pass.

27. The method of claim 20, wherein said first meaning tree represents a first text phrase, said method further comprising:
receiving an edit to said first meaning tree in said first window; and
responsive to said edit, searching for a meaning tree of a different text phrase which corresponds to said edited first meaning tree, and displaying said meaning tree for said different text phrase in said second window.

28. The method of claim 20, further comprising:
visually indicating differences between said first meaning tree and said second meaning tree.

29. The method of claim 20, further comprising:
conforming said first meaning tree to said second meaning tree.

30. The method of claim 1, further comprising:
automatically importing NLU training sentences; and
automatically determining an interpretation of said NLU training sentences according to statistical likelihoods determined from other NLU training corpus of text.

31. The method of claim 1, further comprising:
automatically importing NLU interpretations of training sentences; and
applying said NLU interpretations to said NLU training corpus of text.

32. The method of claim 1, further comprising:
displaying said NLU interpretation information resulting from one of said multi-passes responsive to a user input specifying said one of said passes.

33. The method of claim 1, further comprising:
ordering text phrases of said NLU training corpus of text in a sentence view according to an attribute of NLU interpretation information for said text phrases; and
sequentially displaying said NLU interpretation information for at least two of said text phrases as meaning trees, wherein said meaning trees are displayed according to said ordering of said sentence view.

34. A method of developing natural language understanding (NLU) applications comprising:
determining NLU interpretation information from an NLU training corpus of text using a multi-pass processing technique, wherein alteration of one pass automatically alters an input for a subsequent pass, said NLU interpretation information specifying an interpretation of at least part of said NLU training corpus of text;
storing said NLU interpretation information in a database;
in a graphical editor, presenting selected items of NLU interpretation information as a meaning tree comprised of terminal and non-terminal nodes representing data items and receiving user specified edits to said NLU interpretation information;
identifying an intersection of data items; and
presenting said identified data items as selections for annotating a user specified node of said meaning tree for a sentence of said NLU training corpus of text.

35. An integrated development tool for developing a natural language understanding (NLU) application, said integrated development tool comprising:
a database configured to store items of NLU interpretation information corresponding to an NLU training corpus of text, wherein said items of NLU interpretation information specify an interpretation of at least part of said NLU training corpus of text;
a graphical editor having a plurality of views for manipulating said items of NLU interpretation information, said graphical editor being communicatively linked to said database, wherein a first one of said plurality of views comprises selected items of NLU interpretation information presented as a meaning tree comprised of terminal and non-terminal nodes representing data items, wherein a second one of said plurality of views comprises presenting an intersection of selected nodes of said meaning tree as choices for adding an additional node to said meaning tree; and
a processor configured to determine said items of NLU interpretation information according to a multi-pass system, and to store said items of NLU interpretation information in said database, wherein alteration of one pass automatically alters an input for a subsequent pass, wherein said processor being further configured to determine the intersection of selected nodes of said meaning tree from said items of NLU interpretation information, and to add a node above said selected nodes to said meaning tree, wherein said added nodes are selected from said choices.

36. The integrated development tool of claim 35, further comprising:
a graphical user interface for specifying a search for selected ones of said data items of said NLU interpretation information, said graphical user interface having at least one list of selectable terminals and non-terminals for specifying said search.

37. The integrated development tool of the claim 36, wherein said graphical user interface includes at least one additional area for specifying relationships of said selected data items with other ones of said data items.

38. The integrated development tool of claim 37, further comprising:
a programmed statistical model configured to determine at least one interpretation from said NLU training corpus of text.

39. The integrated development tool of claim 38, said graphical editor having a tree view for presenting said items of NLU interpretation information in a hierarchical tree structure, a dictionary view for presenting individual ones of said items of NLU interpretation information in column format, a sentence view for presenting said items of NLU interpretation information in sentence form, a split screen view for simultaneously presenting two meaning trees, and an import view for importing additional NLU training text and associated interpretation information.

40. A machine-readable storage, having stored thereon a computer program having a plurality of code sections executable by a machine for causing the machine to perform the steps of:
determining NLU interpretation information from an NLU training corpus of text using a multi-pass processing technique, wherein alteration of one pass automatically alters an input for a subsequent pass, said NLU interpretation information specifying an interpretation of at least part of said NLU training corpus of text;
storing said NLU interpretation information in a database;
in a graphical editor, presenting selected items of NLU interpretation information as a meaning tree comprised of terminal and non-terminal nodes representing data items and receiving user specified edits to said NLU interpretation information;
determining an intersection of selected nodes of said meaning tree from said NLU interpretation information;
presenting said intersection of selected nodes as choices for adding an additional node to said meaning tree; and
adding a node above said selected nodes of said meaning tree, wherein said added node is selected from said choices.

41. The machine-readable storage of claim 40, further comprising:
determining a probability indicating whether a portion of said meaning tree is correct; and visually identifying said portion of said meaning tree if said probability does not exceed a predetermined threshold probability.

42. The machine-readable storage of claim 40, further comprising:
determining a number of occurrences of a substructure of said meaning tree within said NLU interpretation information; and
visually identifying said substructure of said meaning tree if said number of occurrences does not exceed a predetermined threshold.

43. The machine-readable storage of claim 40, further comprising:
responsive to a user command, creating an additional node of said meaning tree, said node representing an additional data item; and
associating said node with a description.

44. The machine-readable storage of claim 43, further comprising:
spell checking said associated description.

45. The machine-readable storage of claim 40, wherein a node of said meaning tree is selected, said machine-readable storage further comprising:
responsive to a user request, displaying a dictionary view comprising a plurality of columns for displaying said node and parameters of said node, wherein said dictionary view includes a data item represented by said node.

46. The machine-readable storage of claim 40, further comprising:
automatically completing said meaning tree according to predetermined NLU interpretation information selected from the group consisting of a dictionary of data items, and a model specifying text interpretations.

47. The machine-readable storage of claim 46, said automatically completing step comprising:
determining whether a single data item from said dictionary of data items is associated with a word of said NLU training corpus of text; and
if so, automatically assigning said data item to said word.

48. The machine-readable storage of claim 40, further comprising:
displaying selected items of said NLU interpretation information as a tool tip; and
displaying a probability that said presented meaning tree is a correct interpretation.

49. The machine-readable storage of claim 40, further comprising:
searching said NLU interpretation information for a specified meaning tree structure.

50. The machine-readable storage of claim 40, said presenting step further comprising:
presenting said NLU interpretation information in a dictionary view comprising a plurality of columns for displaying parent and child data items, and parameters of said data items.

51. The machine-readable storage of claim 50, wherein said dictionary view includes a column for indicating children of said data items and another column for indicating parents of said data items.

52. The machine-readable storage of claim 51, further comprising:
sorting said data items according to said child or parent columns.

53. The machine-readable storage of claim 50, further comprising:
visually indicating data items having a probability or count exceeding a predetermined threshold.

54. The machine-readable storage of claim 50, further comprising:
hiding data items having a probability or count not exceeding a predetermined threshold.

55. The machine-readable storage of claim 50, further comprising:
responsive to a user selection of particular data items having an association, searching said NLU interpretation information for a meaning tree comprising terminal and non-terminal nodes representing said association.

56. The machine-readable storage of claim 50, further comprising:
filtering said NLU interpretation information according to a parameter selected from the group consisting of a data item source, a data item target, a direction associated with a data item, an annotator associated with a data item, annotation status, a node count, a data file, a sentence range, and a usage status.

57. The machine-readable storage of claim 50, further comprising:
displaying histogram information derived from said NLU interpretation information.

58. The machine-readable storage of claim 40, said presenting step further comprising:
in a sentence view, presenting said NLU interpretation information associated with individual text phrases, said NLU interpretation information selected from the group consisting of an annotation status, a phrase count, a designated phrase use, phrase collection information, a correctness probability, and a correctness rank.

59. The machine-readable storage of claim 40, said presenting step further comprising:
presenting said NLU interpretation information as a plurality of meaning trees in a split screen view, said split screen view comprising at least a first window for displaying a first meaning tree and a second window for displaying a second meaning tree.

60. The machine-readable storage of claim 59, further comprising:
while displaying said first meaning tree in said first window, presenting different ones of said meaning trees in said second window responsive to a user request.

61. The machine-readable storage of claim 59, wherein said first and second meaning trees are different interpretations of a same text phrase in a same context.

62. The machine-readable storage of claim 61, wherein said first meaning tree represents a correct interpretation of a text phrase, and said second meaning tree represents a predicted interpretation of said text phrase according to a statistical model.

63. The machine-readable storage of 62, further comprising:
if a score of said correct interpretation is greater than a score of said predicted interpretation, indicating that said statistical model is incorrect.

64. The machine-readable storage of claim 59, wherein said first and second meaning trees are different interpretations of a same text phrase in two different contexts.

65. The machine-readable storage of claim 59, wherein said first meaning tree corresponds to a text phrase after a first processing pass, and said second meaning tree corresponds to said text phrase after a subsequent processing pass.

66. The machine-readable storage of claim 59, wherein said first meaning tree represents a first text phrase, said machine-readable storage further comprising:
receiving an edit to said first meaning tree in said first window; and responsive to said edit, searching for a meaning tree of a different text phrase which corresponds to said edited first meaning tree, and displaying said meaning tree for said different text phrase in said second window.

67. The machine-readable storage of claim 59, further comprising:
visually indicating differences between said first meaning tree and said second meaning tree.

68. The machine-readable storage of claim 59, further comprising:
conforming said first meaning tree to said second meaning tree.

69. The machine-readable storage of claim 40, further comprising:
automatically importing NLU training sentences; and
automatically determining an interpretation of said NLU training sentences according to statistical likelihoods determined from other NLU training corpus of text.

70. The machine-readable storage of claim 40, further comprising:
automatically importing NLU interpretations of training sentences; and
applying said NLU interpretations to said NLU training corpus of text.

71. The machine-readable storage of claim 40, further comprising:
displaying said NLU interpretation information resulting from one of said multi-passes responsive to a user input specifying said one of said passes.

72. The machine-readable storage of claim 40, further comprising:
ordering text phrases of said NLU training corpus of text in a sentence view according to an attribute of NLU interpretation information for said text phrases; and
sequentially displaying said NLU interpretation information for at least two of said text phrases as meaning trees, wherein said meaning trees are displayed according to said ordering of said sentence view.

73. A machine-readable storage having stored thereon a computer program having a plurality of code sections executable by a machine for causing the machine to perform the steps of:
determining NLU interpretation information from an NLU training corpus of text using a multi-pass processing technique, wherein alteration of one pass automatically alters an input for a subsequent pass, said NLU interpretation information specifying an interpretation of at least part of said NLU training corpus of text;
storing said NLU interpretation information in a database;
in a graphical editor, presenting selected items of NLU interpretation information as a meaning tree comprised of terminal and non-terminal nodes representing data items and receiving user specified edits to said NLU interpretation information;
identifying an intersection of data items; and
presenting said identified data items as selections for annotating a user specified node of said meaning tree for a sentence of said NLU training corpus of text.

* * * * *